(12) United States Patent
Birnbaum et al.

(10) Patent No.: US 9,244,980 B1
(45) Date of Patent: Jan. 26, 2016

(54) STRATEGIES FOR PUSHING OUT DATABASE BLOCKS FROM CACHE

(71) Applicant: ParAccel, Inc., Campbell, CA (US)

(72) Inventors: Adam Birnbaum, La Jolla, CA (US); Raymi Dyskant, Pittsburgh, PA (US); Scott Graupmann, San Diego, CA (US)

(73) Assignee: ParAccel LLC, Campbell, CA (US)

( * ) Notice: Subject to any disclaimer, the term of this patent is extended or adjusted under 35 U.S.C. 154(b) by 319 days.

(21) Appl. No.: 13/797,728

(22) Filed: Mar. 12, 2013

Related U.S. Application Data (60) Provisional application No. 61/643,231, filed on May 5, 2012.

(51) Int. Cl.
*G06F 7/00* (2006.01)
*G06F 17/30* (2006.01)

(52) U.S. Cl.
CPC .................. *G06F 17/3048* (2013.01)

(58) Field of Classification Search
CPC .................. G06F 17/3048; G06F 12/0862
USPC ......................................... 707/812
See application file for complete search history.

(56) References Cited

U.S. PATENT DOCUMENTS

| | | | |
|---|---|---|---|
| 6,922,753 B2 | 7/2005 | Brown et al. | |
| 7,177,985 B1 | 2/2007 | Diefendorff | |
| 7,359,890 B1 | 4/2008 | Ku et al. | |
| 8,209,291 B1 | 6/2012 | Ma et al. | |
| 8,645,337 B2 | 2/2014 | Kapoor et al. | |
| 8,984,048 B1* | 3/2015 | Maniscalco et al. | 709/203 |
| 2003/0105939 A1* | 6/2003 | Cooksey et al. | 711/203 |
| 2003/0200282 A1 | 10/2003 | Arnold et al. | |
| 2004/0111726 A1 | 6/2004 | Dilley et al. | |
| 2004/0123044 A1 | 6/2004 | Franaszek | |
| 2005/0235122 A1 | 10/2005 | Pillai et al. | |
| 2006/0149702 A1 | 7/2006 | Kaluskar et al. | |
| 2006/0212658 A1* | 9/2006 | Hrle et al. | 711/137 |
| 2007/0016582 A1 | 1/2007 | Kawamura et al. | |
| 2007/0113157 A1 | 5/2007 | Perego | |
| 2007/0156646 A1 | 7/2007 | Komatsu et al. | |
| 2007/0156957 A1 | 7/2007 | MacHardy et al. | |
| 2008/0183688 A1 | 7/2008 | Chamdani et al. | |
| 2009/0019029 A1 | 1/2009 | Tommaney et al. | |
| 2009/0327607 A1 | 12/2009 | Tetrick et al. | |
| 2011/0040771 A1 | 2/2011 | Gilyadov et al. | |
| 2011/0087845 A1 | 4/2011 | Burger et al. | |
| 2011/0131380 A1 | 6/2011 | Rallens et al. | |
| 2012/0173496 A1 | 7/2012 | Hodgens et al. | |

* cited by examiner

*Primary Examiner* — Ann J Lo
*Assistant Examiner* — Van Oberly
(74) *Attorney, Agent, or Firm* — Fenwick & West LLP (57) ABSTRACT

Data of a columnar database is organized into extents. Each extent occupies contiguous storage on the disk. An extent stores database blocks of a column of a database table. The database system adds new database blocks of a column to the extents assigned to that column. When a request for adding a block to a table is received, the extent for the table and column combination is obtained and the block added to the extent. Prefetching strategies are used to retrieve database blocks in advance of an actual request. The rate of prefetching is determined per column. The rate of prefetching is adjusted based on the number of faults encountered for the column. Database blocks no longer needed in memory are pushed out. When a scan process is reading blocks, as soon as the block has been processed it is scheduled to be pushed out.

16 Claims, 9 Drawing Sheets

STRATEGIES FOR PUSHING OUT DATABASE BLOCKS FROM CACHE

CROSS REFERENCE TO RELATED APPLICATION

This application claims the benefit of U.S. Provisional Patent Application 61/643,231, entitled "Management of Database Blocks," filed on May 5, 2012, which is incorporated by reference in its entirety.

FIELD OF ART

The disclosure generally relates to management of database blocks for improving performance of database systems.

BACKGROUND

Databases store data on secondary storage devices, for example, disks. The access time for data stored in memory is typically less than the time taken to access data from secondary storage. Secondary storage devices may require mechanical movement of parts to access data, for example, a seek operation. In contrast, there is no mechanical movement of parts to access data stored in memory, thereby making access to in memory data fast. However the cost per unit storage of memory is much higher than the typical cost per unit of storage on secondary devices. Therefore database systems typically have much less memory to store data than the amount of secondary storage available.

Data is typically fetched from the secondary storage to memory in units called blocks or database blocks for processing. Inefficient strategies for managing database blocks can result in inefficiencies in the database system. For example, if a process needs data for processing a query and the data is not available in memory, the process causes a block fault, i.e., the database system has to read the data from the disk. Meanwhile the process has to wait for the requested data to be available thereby slowing down the processing of the query.

Another problem occurs when there is no room in the memory to store the new database block being read. In this situation, the database system evicts a database block from the memory to make room for the new database block being read. If the database block evicts a database block that has been read into the memory has not been processed yet, the entire effort of reading the evicted database block in memory is wasted.

Another problem occurs if data used for processing a query is fragmented into chunks of data stored in different portions of a disk. If data is fragmented and stored in different portions of a disk, loading the data requires multiple seek operations. This slows down the access to the data. One conventional mechanism to improve performance of data accessed from disk is to perform a defragmentation operation that copies the blocks from their current locations to new locations and arranges the blocks of data in contiguous locations on the disk. However, this operation is typically executed manually by an operator. This increases maintenance overhead of the database system. Also the defragmentation operation can take a long time to execute since a very large amount of data is being copied. During this time the database system may have to suppress processing of user queries in order avoid synchronization issues.

SUMMARY

Embodiments of the invention manage cache of a database system by determining which blocks to push out from the cache to make room for new blocks. The database system executes a set of scan processes, each scan process reading blocks of a table in a scan order for processing a query. The database system prefetches blocks of the table from a persistent storage device and stores them in a cache. The database system associates each prefetched block in the cache with scan processes expected to read data from the prefetched block. For example, if a scan process is reading a database block of a table, other database blocks of the table following the currently read database block in the scan order may be expected to be read by the scan process. When the database system completes processing of data of a prefetched block for a scan process, the database system determines checks whether any scan process is likely to process the prefetched block. The database system determines whether any scan process is likely to process the prefetched block by verifying that each scan process associated with the prefetched block has completed processing of the prefetched block or the processing of a block ranked after the prefetched block in the scan order. If the database system determines that no scan processes are likely to process the prefetched block, the database system marks the prefetched block as free. Accordingly, the database system may overwrite the storage space of the prefetched block marked free using a new block read from the persistent storage.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

The strategies used for managing blocks of data can have significant impact on performance of a database. Examples of strategies used for managing blocks of data include strategies for organizing how data is stored on the secondary storage ("data layout"), how data blocks are fetched into memory ("fetching" and "prefetching") and how blocks may be removed from memory when not needed ("eviction"). Embodiments are described for different types of strategies for managing database blocks.

System Environment

Figure 1:
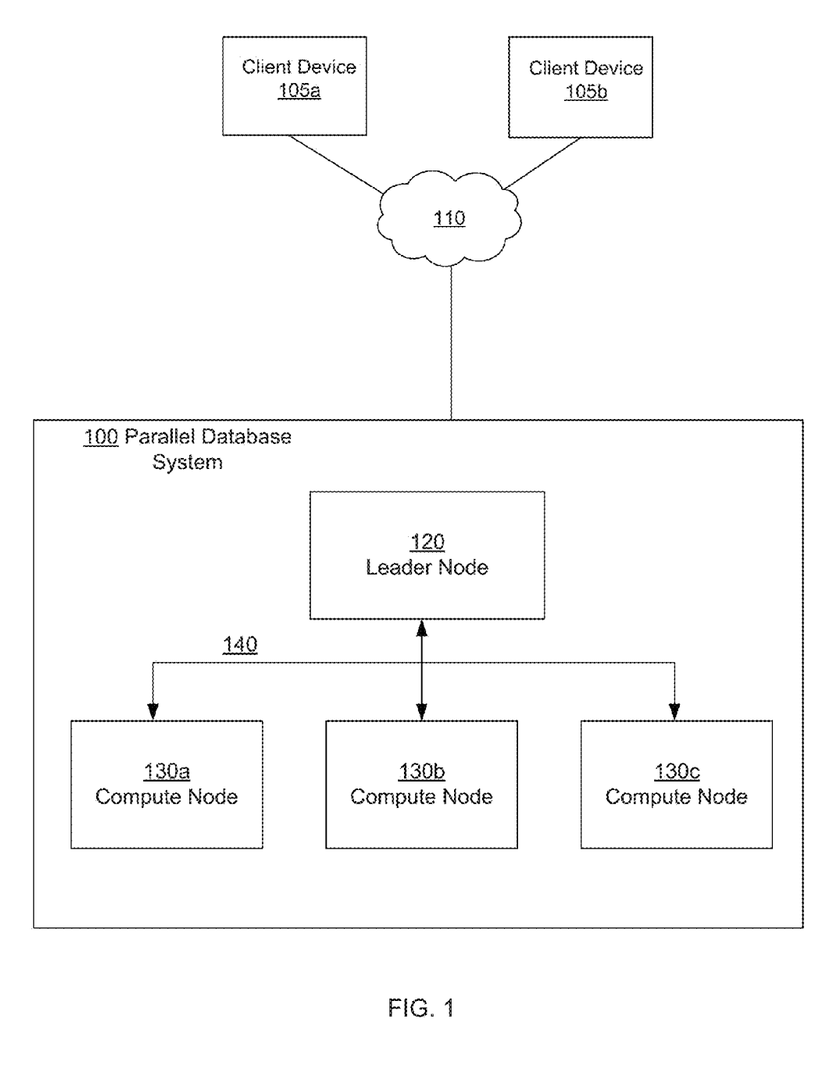
FIG. 1 shows the architecture of a parallel database system, in accordance with an embodiment of the invention.

FIG. 1 shows the overall system environment illustrating the architecture of a parallel database system 100, in accordance with an embodiment of the invention. At the highest level, a parallel database system 100 has four main architectural components: The leader node 120, the compute nodes 130, the parallel communication fabric 140, and an optional storage area network (SAN) (not shown in FIG. 1). (A letter after a reference numeral, such as "130a," indicates that the text refers specifically to the element having that particular reference numeral, while a reference numeral in the text without a following letter, such as "130," refers to any or all of the elements in the figures bearing that reference numeral.) Although the system described herein is a parallel database system, techniques disclosed herein apply to a database system that is executed using a single processor.

The leader node controls the execution of the compute nodes. All nodes communicate with each other via the fabric. For example, the leader node 120 and the compute nodes 130 can be standard x86 servers running Linux. Users and applications may communicate with the system via the leader node by using standard interfaces, ANSI SQL via ODBC/JDBC (in general, "the system" refers to a parallel database system 100 herein.)

The leader node 120 may be on the network and is intended to interface with external applications and the rest of the computers on a network. In an embodiment, leader node communicates with applications and users via client protocols, including standard ODBC or JDBC, and recognizes ANSI SQL plus database extensions. A leader node is required to manage communication with the compute nodes. The leader node is responsible for controlling sessions, parsing and optimizing queries, and scheduling execution of the workload, but the leader node may or may not participate in data operations. Architectural workload separation by node type, i.e., leader node and compute nodes allows for better throughput optimization. The bandwidth of leader node is optimized for outward communication and handling of query overhead so the resources of each compute node can be dedicated to data operations.

Compute nodes 130 are the components of the parallel database system 100 responsible for processing and storing data. Each compute node 130 stores and manages a subset of the rows of each table. For example, if a table has 1 billion rows and there are 20 compute nodes, then approximately 50 million rows are distributed to each compute node 130.

Data may be distributed to a particular compute node 130 based on a hashing algorithm applied to a distribution key, or by round robin. Distribution keys, such as the primary key or other popular join column may be used for even distribution of data, especially when queries will benefit from collocated joins by using the same distribution key. In cases where an inherently balanced distribution key isn't obvious or doesn't exist, round robin distribution may be used to balance the data.

By utilizing multiple methods of data distribution, it is possible to maintain the appropriate balance between data distribution and performance so the parallel database system 100 can take best advantage of its resources and provide good parallel efficiency. The performance of the parallel database system 100 is driven by how many compute nodes 130 are present. For example, with most applications, a 50-compute node system may perform almost 5× faster than a 10-compute node system.

Each compute node 130 depends on a set of processes to manage resources of that node, for example, communication, and secondary storage. In order to achieve maximum parallelism, the parallel database system 100 logically partitions data for all tables into multiple subsets per node so that multiple cores can be used to process the data for those tables during queries. These logical partitions are referred to as "slices", and in an embodiment, the number of slices per node is typically configured to correspond to the number of cores per node. Each slice is given a set of query execution processes at system startup, and parallelism is achieved by having the processes of all slices competing for the node's shared resources. Slices communicate with other slices via the communication fabric, but they may not be directly accessed by end user applications. In certain contexts, a slice refers to the portion of data that is allocated to a process (or core) for processing.

In an embodiment, the communication fabric 140 is a high performance fabric based on standard, 1 or 10 Gigabit Ethernet (GbE) and standard multi-port switches that have full crossbar support. The communication fabric 140 may use a custom protocol to enable highly efficient communication among each of the nodes (leader and compute). The communication fabric 140 delivers maximum interconnect performance because it is specifically designed for how traffic moves in a complex, parallel database environment. For example, communication fabric 140 is configured to efficiently handle movements of large intermediate result sets, data redistribution, low rate of packet loss and so on. In some embodiments, communication fabric 140 uses multiple links simultaneously running multiple data streams. The communication fabric 140 is implemented internally as multiple independent networks all communicating data for the parallel database system 100. In some embodiments, two GbE fabrics may be used for high availability. In other embodiments, the parallel database system 100 can utilize as many communication fabrics 140 as are available for increased performance.

Client devices 105 are computing devices that execute client software, e.g., a web browser or built-in client application, to interact with the parallel database system 100 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that send interact with a database system.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the parallel database system 100 are typically performed via a network 110, for example, via the internet. The network 110 enables communications between the client device 105 and the parallel database system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

Figure 2:
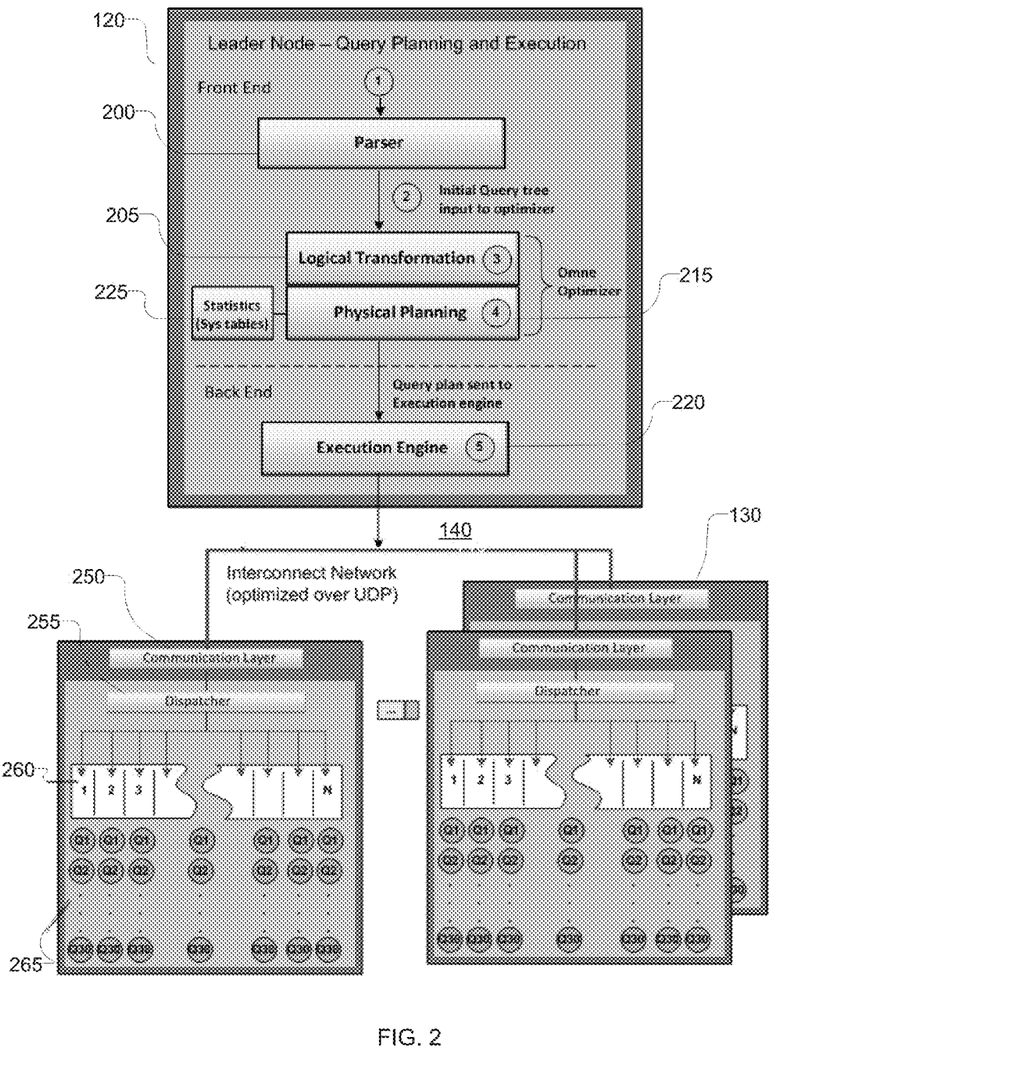
FIG. 2 shows a high level view of internal components and functionality provided by parallel database system 100, in accordance with an embodiment.

FIG. 2 shows a high level view of internal components and functionality provided by parallel database system 100, in accordance with an embodiment. The compute nodes 130 implement a set of processes running on the node server's operating system that manage communication with the leader node 120 to receive commands and send back data, and route compiled code to individual query processes, for each core or slice on the node, to execute for a given query.

When a new client request comes in to perform a query or some other type of database operation, the parallel database system 100 spawns a new process (referred to herein as the padbmaster process) to maintain session information for that client. That process is maintained as long as the client session remains open and that client is sending query requests to the leader node 120.

The following steps detail the high-level operations that take place in processing a client request from its initial creation to sending results or status back to the client, to complete the request. After creating a padbmaster process to maintain the connection with a new client, the parallel database system 100 routes the requested operation, for example, a SQL query or some other database operation through the parser and optimizer to develop a query execution plan to perform or execute the specified query or database operation.

The parser 200 parses any command or query received by the leader node 120. The parser builds a parse tree representation of the query/command that is passed to the optimizer. The optimizer comprises a logical transformation module 205 that performs query rewrite (for optimization purposes) and physical planning module 215 that generates a query plan. The execution engine 220 transforms the query plan into a series of physical operations referred to as an execution plan, and generates code that is sent to the compute nodes for execution.

Each compute node 130 performs processing of queries with execution of compiled code from the execution plan and sends intermediate results from queries back to leader node 120 for final aggregation. Each compute node 130 may be considered divided into slices, typically one slice per core or processor. Each slice is associated with a portion of data that is processed by the slice. All slices on each node share the server's memory and disk space to parallelize the workload for a query or other database operation sent to all the compute nodes 130. Each compute node 130 includes a communication layer 250 for communicating, for example, with the leader node and a dispatcher 255 that assigns a particular query task to corresponding slice query processes available to perform queries within each compute node 130. Each slice can have a pool of separate processes that can independently run compiled query code for a slice of data associated with a query task or other database operation. Additional leader node 120 and compute node 130 communication processes handle the transfer of commands and data back and forth between the leader node 120 and compute nodes 130 associated with the execution of specific query tasks.

In an embodiment, the parallel database system 100 represents data in columnar form. Using columnar storage for database tables can reduce the overall disk I/O requirements and optimizing analytic query performance. By storing database table information in a columnar fashion, the number of disk I/O requests is reduced and the amount of data that needs to be loaded from disk is reduced. Furthermore, disk requirements can be reduced with compression methods that are matched to the columnar storage data type.

Columnar storage reduces the overall number of disk I/O operations needed to store and retrieve column field values for the rows in a table. Conversely, for a given number of disk requests, the system can retrieve the column field values for many more rows than if the blocks stored entire table rows. Analytic database may have large number of columns in a table. These tables are commonly referred to as fat tables. Since several queries process data from only a few of these columns, columnar databases retrieve much less data than a database that stores table row wise. The databases that store tables row wise need to retrieve data from all columns that are not requested whereas columnar databases retrieve only the requested data. As a result, performance of columnar databases can be significantly faster than databases that store tables row wise, esp. for analytic queries. Since each block also contains uniform data, that is, column field values all with the same data type, the system can further reduce disk storage and retrieval requirements by applying a compression method best suited to that particular column data type.

The savings in space for storing blocks containing only field values of a single column on disk also carries over to retrieving and then storing that data in memory. Since many database operations only need to access or operate on one or a small number of columns at a time, the system can save memory space over that required with traditional row-based storage by only caching blocks for columns you actually need to execute a query.

Figure 3:
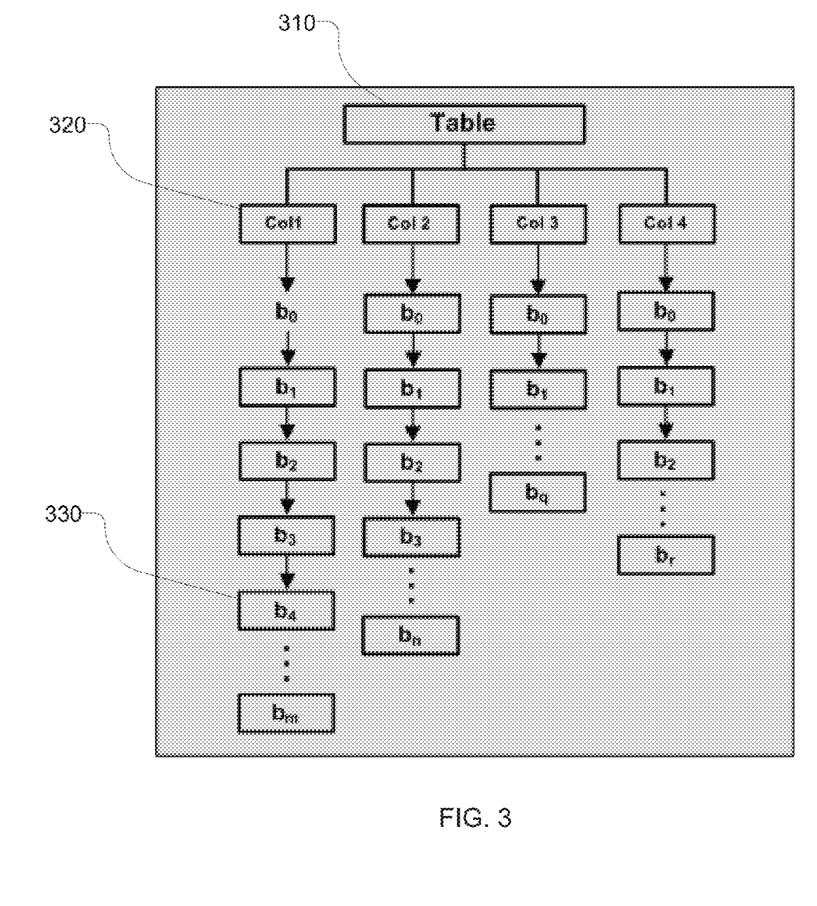
FIG. 3 illustrates how a parallel database system maintains separate lists of blocks for every column in a table, in accordance with an embodiment.

FIG. 3 illustrates how the parallel database system 100 maintains separate lists of blocks 330 for every column 320 in a table 310, in accordance with an embodiment. So, when retrieving multiple column values from a table 310, the parallel database system 100 stores column values for the same set of rows in memory for the same node and slice. To keep track of the blocks 330 and where they are stored on disk or in memory, every node maintains an in-memory structure referred to as the "superblock". The superblock contains a linked list of block "headers" that stores information about every column in every table in a database. Each block header in the linked list has information on one specific block, its storage location on disk, and other information about the block and the data it contains.

Figure 4:
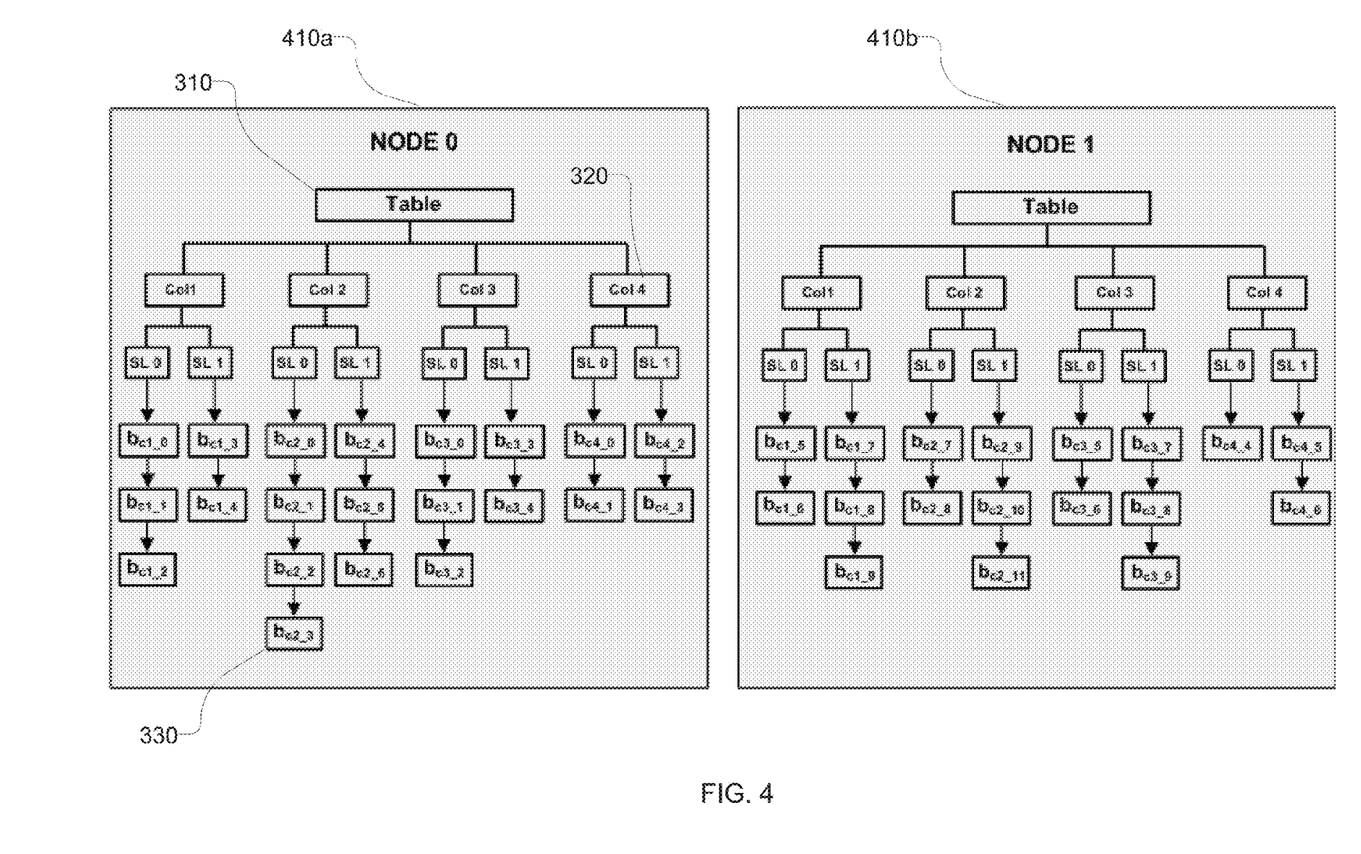
FIG. 4 illustrates distribution of blocks for a columnar distribution across two nodes with two slices per node, in accordance with an embodiment.

FIG. 4 illustrates distribution of blocks for a columnar distribution across two nodes 410a and 410b (labeled as node0 and node1 respectively) with two slices SL0 and SL1 per node, in accordance with an embodiment. Note that each slice can store different number of blocks for different columns due to differences in the types of data of each column. For example, column 4 data may be compressed better, resulting in only two blocks stored for slice SL0 and slice SL1 on node 0 for column 4. In contrast, the data of column 2 may not be compressed as well, and there are 4 blocks stored for slice SL0 and 3 blocks for slice SL1 on node 0 for column 2.

System Architecture

Figure 5:
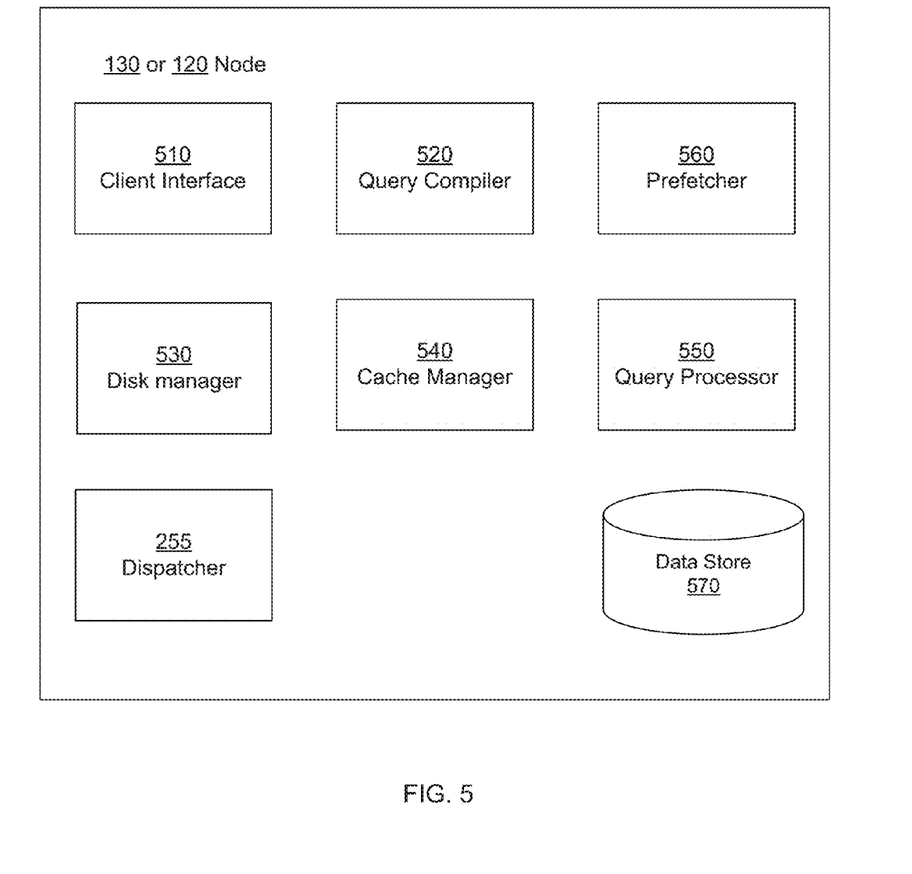
FIG. 5 is a high level block diagram illustrating the system architecture of a node of the parallel database system, for example the leader node or the compute node, in accordance with an embodiment.

FIG. 5 is a high level block diagram illustrating the system architecture of a node of the parallel database system, for example the leader node or the compute node, in accordance with an embodiment. The node 120 or 130 comprises a client interface 510, a query compiler 520, a prefetcher 560, a disk manager 530, a cache manager 540, a query processor 550, a dispatcher 255 and a data store 570. In alternative configurations, different and/or additional modules can be included in the system.

The client interface 510 allows a node to interact with client devices 105. The query compiler 520 compiles each query to generate a plan for execution of the query and performs any optimizations needed. The query processor 550 performs operations required for processing queries for example, fetching data required for a query and performing any computations required for the query. The prefetcher 560 fetches the data required for processing queries. The data store 570 stores the data on a persistent storage, for example, a disk. The disk manager 530 interacts with the persistent storage device, for example, a disk and manages blocks of data for example, by determining where the blocks are stored on a disk, prefetching blocks, determining which blocks are pushed out from memory to bring in new blocks.

Strategies for Writing Blocks

Embodiments store data on the persistent storage to allow efficiently reading the data. The data is stored on the disk in an order that minimizes the amount of seek operations while reading the data and maximizes the time spent by the disk manager 530 reading the data. Accordingly, embodiments store data in the same order in which the compute nodes 130 expect to read the data. Furthermore, when a block is requested from disk, the compute nodes read ahead to bring into memory the database blocks that are expected to be required soon after the data being presently read.

Conventional ways of choosing addresses to store a block on the disk typically use the lowest unused disk address for whichever block requests it. However, the order in which the unused disk addresses become available is application dependent and not predictable. As a result, with this method, at the end of a load the disks are already highly fragmented. Accordingly, the system needs to perform a large number of seek operations to read data. For example, the system may perform a seek operation for almost every single block.

To avoid these and other problems, embodiments write data blocks such that data blocks that are needed together are stored together on the disk. As a result these blocks can be fetched together by performing a single disk seek operation. This results in improved performance of reading of blocks without having to perform the slow defragmentation operation described above.

Figure 6:
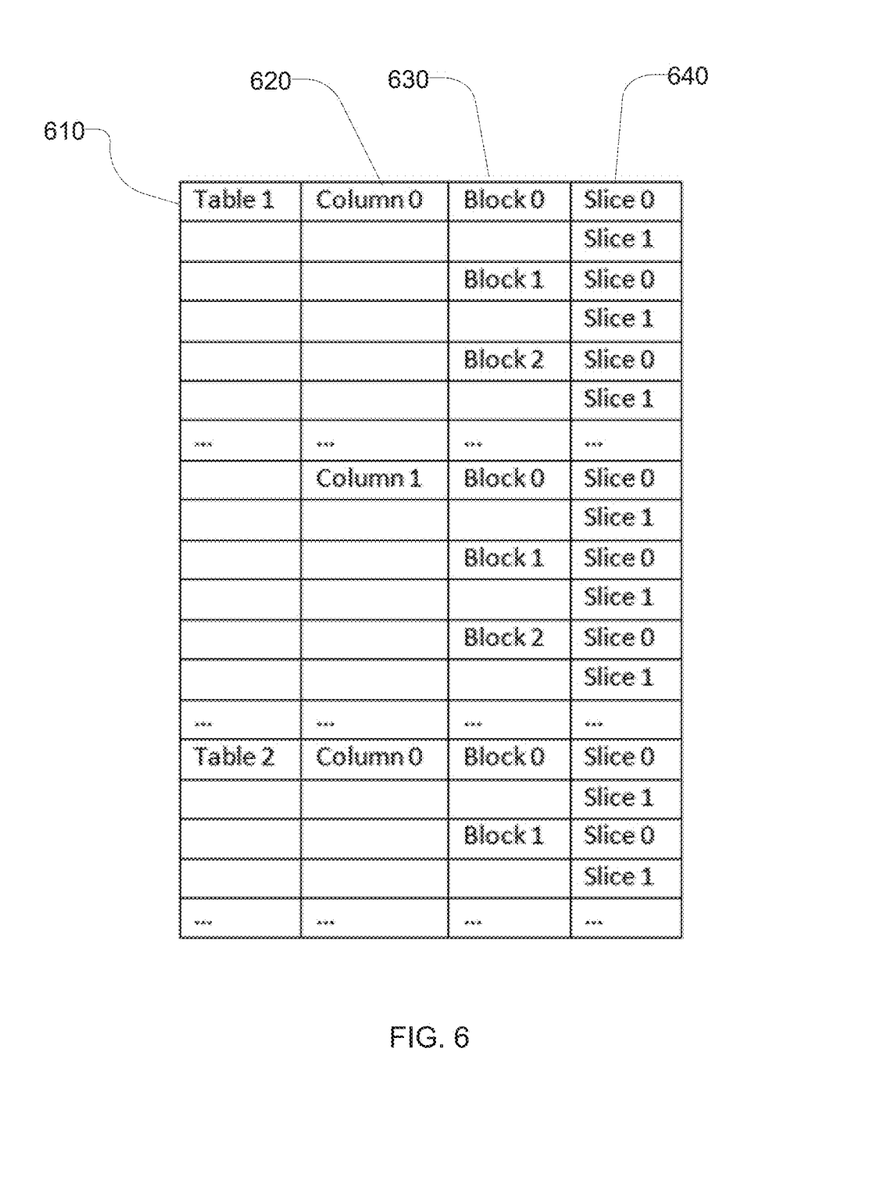
FIG. 6 illustrates a possible layout for tables that would result in good performance when data is read for query processing, in accordance with an embodiment.

FIG. 6 illustrates a possible layout for tables 610 that would result in good performance when data is read for query processing, in accordance with an embodiment. As shown in FIG. 6, the blocks 630 are stored on disk such that they are sorted by the keys. Each table 610 has columns 620 that comprise blocks 630 corresponding to each slice 640. In an embodiment, a key is determined as (table, column, block number, slice). This mapping stores "sibling" blocks for multiple slices of the same position in a column in adjacent disk addresses. For example, when a read request is received for a block in a column, the equivalent block for the same column on other slices can also be fetched assuming it will be needed 'soon'. Furthermore, the next couple of blocks in the column, for all slices may be read assuming that they will be needed 'soon' too. Accordingly, FIG. 6 illustrates a perfect order for storing data if the data of a column is processed, for example, by a scan operator.

However, not all blocks of the database need to be stored as shown in the perfect order illustrated in FIG. 6. The performance is improved even if blocks are stored in regions that satisfy the order illustrated in FIG. 6, i.e., each region satisfies the order but the order may not be satisfied across regions. In this situation, after a seek is performed to reach the region, the blocks from that region may be fetched together, thereby improving the performance. This amortizes the performance across multiple seek operations. These regions are referred to as extents, such that each extent is a contiguous region of the disk.

Figure 7:
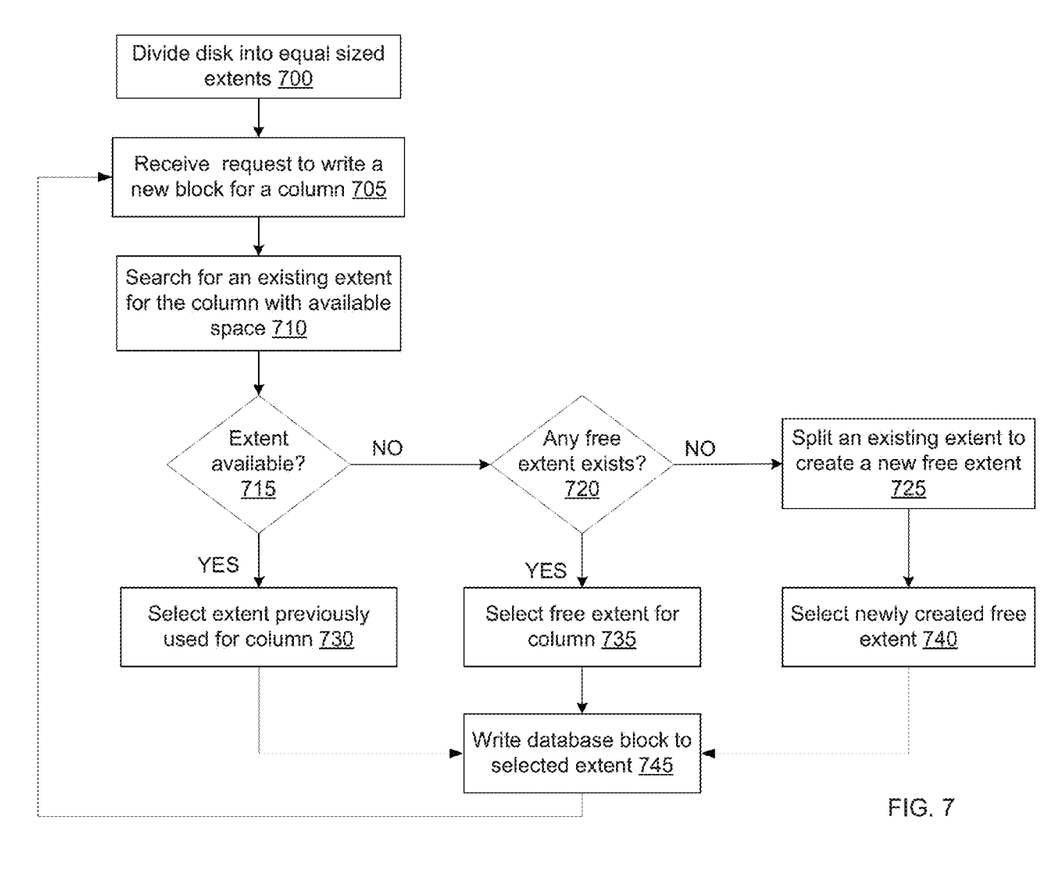
FIG. 7 describes a flowchart for illustrating the process of identifying an extent for storing a block being written to a disk, in accordance with an embodiment.

FIG. 7 describes a flowchart for illustrating how the process of identifying an extent for storing a block being written to a disk, in accordance with an embodiment. Initially the disk manager 530 divides 700 the disk into equal sized extents. The system may allow a default extent size which is the maximum size of an extent. The disk manager 530 divides 700 the disk into extents of the default size. In the following process, each extent stores blocks of a particular column. Accordingly, each extent is associated with a particular column.

The disk manager 530 receives 705 a request to write a new block for a column. The disk manager 530 searches 710 for an existing extent that has been previously used for storing blocks of this column such that the extent has available space. If the disk manager 530 determines 715 that an extent exists that was previously used for storing this column and the extent has space available to store the new block, the disk manager 530 selects 730 this extent and writes 745 the block to this selected extent.

If the disk manager 530 determines 715 that there are no extents that store data from the column that have available space to store the received database block, the disk manager 530 checks 720 if there is any available extent that is not assigned to any column that has free space for storing the block. If the disk manager 530 identifies an extent that is free and not assigned to any column, the disk manager selects 735 the identified extent and writes 745 the database block in the selected extent. This extent is associated with this column so that subsequent blocks from this column can be stored in this extent until the extent runs out of space.

If the disk manager 530 determines 720 that there is no available extent that has free space for storing the block, the disk manager 530 splits 725 an existing extent to create a new free extent. The disk manager 530 selects 740 the newly created free extent and writes 745 the current block to this newly created extent. The above process is repeated every time the disk manager 530 receives 705 a request to write a database block.

In an embodiment, the disk manager 530 hashes the table id and column id of the current block to generate a hash value. The disk manager 530 maintains a mapping from hash values obtained from table ids and column ids and the available extents. The disk manager 530 uses the mapping to quickly identify which extent is being used to write blocks from a column.

In an embodiment, when a database block is freed from the disk, the disk manager 530 can use the freed database block to for a future write for the same column assigned to the disk extent. If all the database blocks of an extent are freed, the extent is freed and is not assigned to any column. Accordingly, the disk manager can use the freed extent to store database blocks from another column.

If the extent becomes free at certain stage, the disk manager checks if the newly freed extent can be merged with any neighboring free extent, provided the size of the merged extent is below the original default extent size. Accordingly, the disk manager checks the total size of the freed extent and the size of another free extent. If the total size of the two free extents is below a threshold value, the two free extents are combined into a larger free extent. The threshold value may be the default extent size used when extents are initially created.

The above process may be invoked multiple times when a set of tables as loaded. In these embodiments, a tiny column may reserve the default extent size. If a large number of small tables is being stored, each of which stores only a few blocks per disk, the system reaches a state where all of the extents are partially used. In this situation a larger table that is loaded later ends up splitting the extents of the tiny tables. This may result in slow scan speed due to fragmentation of the large table, rather than running out of disk space.

As an example, if there are 248 GB disks, and the system starts by dividing them into 64 MB extents, initially the system will have 4000 free extents, each of which starts on a 64 MB boundary. If 4000 tiny dimension columns are loaded, all of these extents get written to, and the next column to request an address results in the disk manager 530 dividing one of the partially-used 64 MB extents into two 32 MB extents.

Following embodiment address this issue. In this embodiment, the larger tables are loaded before smaller tables, thereby reserving entire extents for the larger columns, and forcing the smaller columns to split disk extents. In another embodiment, this issue is addressed by the disk manager 530 receiving information describing the table sizes and identifying the presence of several small tables in the set of tables being loaded. In this situation, the disk manager 530 configures the default extent size to be smaller, so the minimum size consumed per column is decreased.

In another embodiment, there are at least two different sizes of extents, small and large. For example, the small extents can be ¼ the size of the large extents. The first few blocks of each column are called the "early" blocks since the requests to write these blocks when the table is loaded arrive early. These blocks can be the first N blocks of the column, where the value of N is a system configuration parameter. In this embodiment, the early blocks of each column are stored in a small extent. If more than a threshold number of (i.e., more than N) blocks of the column are received, the additional blocks received are stored in one or more large extents. This is based on an assumption that a schema typically has a large number of columns that occupy small space, i.e., the space allocated for the small extents. For example, the dimension tables in a star schema may all occupy very small amounts space. The remaining columns typically are large and are likely to occupy one or more large extents. In other words, the first extent of any table is small and the remaining extents of the table are large. In an embodiment, the size of the small extents is a fraction of the size of large extents, for example, a quarter of the large extents.

In another embodiment, certain extents are identified as extents that can occupy blocks from multiple columns. All early blocks of all columns are added to these extents. The blocks received after the early blocks have arrived for a column are added to extents that are assigned to the particular column. Accordingly, all early blocks of different columns may be stored together in these extents that are configured to store blocks from multiple columns. Later blocks, i.e., blocks that are nor early however are stored in extents that store only blocks from a particular column. Only a few blocks for each column go into the mixed extent, so there are only a few seeks for those blocks, which the system would have to execute anyway for the first block of a column because the system has to seek to the start of a non-mixed extent.

In an embodiment, each extent is mapped to a combination of table id, column id, and slice id. Accordingly, two blocks of a column that correspond to different slices are written to different extents. This allows different slices to be read in parallel. In this embodiment, an extent corresponds to a slice rather than a column and blocks from different slices of the column are stored in different extents.

In an embodiment, if a request to free a database block from an extent is received, the disk manager frees the disk space used for the database block and tracks extents with freed blocks. If there is a request to store a database block for a column, the disk manager checks if there are available extents assigned to the column with database blocks that have been freed. If the disk manager finds an extent with a database block that has been freed, the disk manager stores the database block in this extent.

The embodiments perform well for large sequential scans where data blocks are referenced in order. This is a typical access pattern for analytic databases where entire columns of a table are typically be scanned.

Strategies for Prefetching Data

The goal of prefetching is to get the data in memory in advance of a request for the data by the query processor 550. If a query processor 550 requests data and the data is not available in the memory, the query processor 550 causes a block fault thereby invoking the disk manager to read a block from the disk including the requested data. As a result the query processor 550 has to wait for the requested data to be available. If the requested data is fetched in advance by the query processor 550, the query processor 550 does not have to wait for data to be read from the disk and can continue processing as fast as the processing power of the system allows.

Embodiments decrease the frequency of block faults by prefetching data in advance of requests from the query processor 550, so that query processing by a processor may be overlapped in time with disk reads/writes. On the other hand, prefetching too many data blocks in advance may fill up the cache. When the cache is full, a request for new data may require that previously prefetched data has to be evicted from memory before the query processor 550 has had a chance to use the data. This may lead to cache thrashing.

Embodiments adjust the rate at which data is prefetched based on the rate of block faults and the rate of eviction of blocks from the memory. When a scan of a column begins, for example, in a fetcher, the query process assigns a unique identifier for the scan process. As the scan proceeds, the query processor 550 sends a request to the disk manager, informing the disk manager that the query processor 550 is likely to request the database block in the near future. The query processor 550 creates a "cache frame" that associates the database block with the scanner. Thus the disk manager can manage a collection of cache frames for each scanner, allocating cache memory among all of the concurrent scanners.

The allocation is dynamically adjusted. If a particular scanner causes a block fault, the disk manager attempts to read farther ahead on that block chain if possible, so a larger proportion of the disk cache is allocated to that scanner. If, on the other hand, a database block is pushed out of the cache before the data of the database block is processed by the query processor 550, the effort of bringing in the database block from the persistent storage to the memory gets wasted. In this situation, the disk manager "throttles back" and reduces the total amount of cache memory allocated to all scanners or to a set of scanners.

The fetcher may be considered a process, a thread, or a task executed by a query process. The fetcher generates a series of requests for database blocks from a particular column or from a particular column for a particular slice. Each fetcher is customized for the column and optimizes data retrieval from the persistent storage to the memory for that column. For example, each column may use a particular type of data compression. Accordingly, the data for the column may be stored in the persistent storage in a compressed format that is customized to the column. As a result, the compression scheme used for data stored on the persistent storage device for two different columns may be different. A fetcher associated with a column executes the logic to decompress data from the column storing data of a particular type. For example, a fetcher may decompress data from a column storing integers, another fetcher may decompress data from a column storing floating point numbers, and another fetcher may decompress data from a column storing character data.

In an embodiment, the prefetching memory limit is determined by a system setting called "read_ahead." For example, for certain system configurations, the read_ahead parameter may be set to 4 MB per column. Note that this does not limit the memory usage for each column to 4 MB. The read_ahead parameter specifies that each time a read request is received for any column, the system attempts to read ahead 4 MB worth of sibling blocks, until the disk cache is full or the system-configured "prefetch limit" is reached. Thus, a query scanning 10 columns may have 40 MB of outstanding read requests queued in the disk subsystem. As a result, the disk cache needs to be large enough to hold the data being read. If the disk cache is small, reading large amount of data results in thrashing.

In an embodiment, there is a query processor 550 per slice. The query processor 550 invokes the fetchers associated with the queries to get values from the column associated with the fetcher. For example, a query Q may determine a result based on values from column A, column B, and column C. Accordingly, there may be three fetchers, one for each of the columns A, B, and C. To process each row, the query processor 550 for query Q gets the value from each column by invoking a method from the fetcher corresponding to each column. The query processor 550 may invoke a method fetcher<column_id>.get_value( ), for example, fetcherA.get_value( ), or fetcherB.get_value( ), or fetcherC.get_value( ). Invoking the get_value( ) method of a fetcher generates a request to the disk manager to retrieve the current block of the column the fetcher is reading.

Figure 8:
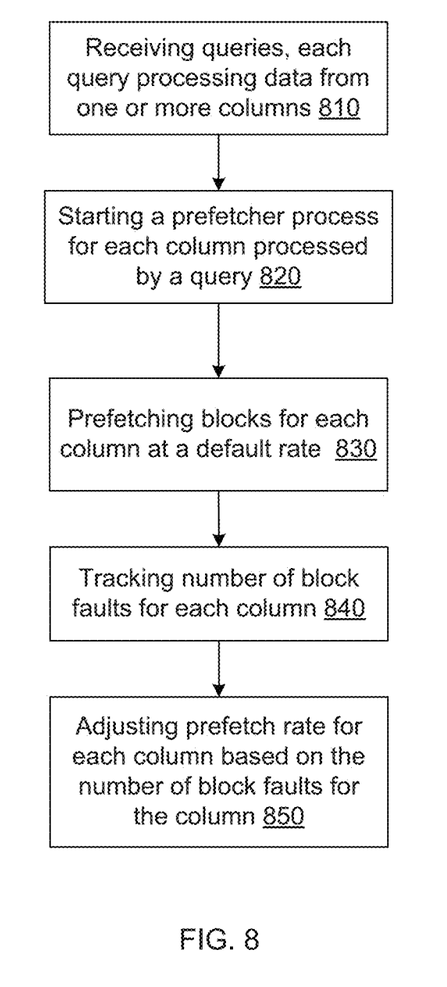
FIG. 8 describes a flowchart for illustrating the process of prefetching blocks in memory from disk, in accordance with an embodiment.

FIG. 8 shows a flowchart illustrating the process of prefetching blocks, in accordance with an embodiment. In an embodiment a prefetcher 560 is a separate process or thread that performs prefetching. In another embodiment, a prefetcher 560 is implemented as a function call within a disk manager that is associated with a set of data structures managed by the disk manager. The dispatcher 255 receives 810 queries processing data from one or more columns. There may be multiple queries received at approximately the same time, resulting in the queries being processed concurrently.

A query may process multiple columns from the same table or from different tables. The dispatcher 255 starts a set of query processes running the query, and these processes generate requests to the disk manager 530 to fetch blocks from secondary storage. Upon receiving initial requests for each column from each query process, the disk manager 530 establishes a set of prefetcher data structures corresponding to those requests. These data structures are used in conjunction with the prefetcher 560 to plan the future reads for each column. For example, if a query process requests a block of a column, the prefetcher 560 may determine that a set of blocks following the requested block are likely to be requested next by the query process. Accordingly, the disk manager 530 prefetches these blocks even before the query process has explicitly requested these blocks. The prefetcher 560 prefetches 830 blocks from the column at a default rate.

The prefetcher 560 tracks 840 the number of block faults that occur for each fetcher. If the prefetcher 560 detects block faults, the prefetcher 560 adjusts 850 the rate at which it prefetches data blocks for that fetcher. For example, if the rate at which block faults occur exceeds a threshold value (for example, a threshold value of zero or greater than zero) the prefetcher 560 may increase the rate at which it prefetches the data blocks. It is possible that there are two separate prefetcher 560s each reading the same column, but generating block faults at different rates.

Since the total available space in memory is limited, not all columns can continue increasing the rate at which data blocks are prefetched. In an embodiment, if one particular column requests an increase in the rate at which blocks are prefetched for the column, the prefetch rate of blocks of one or more other columns may be reduced.

In an embodiment, the system increases the number of prefetch points given to each fetcher responsive to the prefetcher 560 experiencing block faults. However, throttling is applied across multiple fetchers or all fetchers. As a query is being processed and the prefetchers hit block faults for multiple columns, the rate of prefetching is increased for all these columns. If a new scan process starts processing a new column, the rate of prefetching for the new column is low compared to the remaining columns that have already hit block faults. In an embodiment, the database system starts the scan for the new column at a prefetch rate that proportionate to the prefetching rate of the columns currently being prefetched in the system. For example, the scan of the new column may be started at a rate that is average of the prefetching rate of the columns currently being prefetched in the system. In another embodiment, the new scan is started at a standard value, for example, a constant value that is configured for the system, and the system lets the scan catch up as it hits block faults.

The prefetcher 560 determines the rate of prefetching based on the rate of block faults encountered for the column. The rate of block faults provides an indication whether the prefetcher 560 is prefetching too far ahead or it is prefetching insufficient amount of data. Accordingly, the prefetcher 560 throttles its rate of prefetching to adjust based on the rate at which the data being prefetched is consumed. Furthermore, each prefetcher 560 adjusts responsive to the requirements of other prefetchers, i.e., if one particular prefetcher determines that it needs data at a higher rates, one or more other prefetchers are throttled back to prefetch at a slower rate to allow the first prefetcher to meet its demand.

In an embodiment, each prefetcher 560 is associated with a score that determines the rate at which the prefetcher 560 prefetches the data blocks. Each prefetcher 560 may be initialized with a default score value. If the prefetcher 560 encounters a block fault, the score of the prefetcher 560 is increased, thereby increasing the rate at which the prefetcher 560 retrieves the data blocks. The total score of all the prefetchers is maintained below a threshold value. Accordingly, if the total score of all prefetchers reaches the threshold value and still a prefetcher hits a block fault, the system identifies one or more prefetchers for reducing their score value. In an embodiment, an overall multiplicative factor is applied to the score of all prefetchers to reduce overall prefetching, In an embodiment, if a prefetched block is pushed out even before the corresponding query processor 550 has a chance to read that data from the block, the system throttles multiple prefetchers by reducing the rate at which they are prefetching blocks, for example, by reducing their corresponding scores. In this situation, the system determines that the aggregate of all prefetchers is retrieving at a very high rate and the overall system needs to reduce the overall aggregate prefetching rate.

Certain queries may request only a subset of blocks rather than require a scan of the entire set of blocks of the column. For example, a condition specified with a query may cause the query to access only a range of rows. Specifically, the query processor 550 can inform the disk manager 530 that the query processor 550 is interested in a specific set of blocks. Therefore, the set of blocks that need to be scanned are known at the beginning of the scan. These types of scans are also referred to as range-restricted scans. For example, if the query specifies that only rows corresponding to column values greater than a threshold value need to be processed, the disk manager 530 utilizes this information to ensure that it prefetches only the subset of blocks requested.

In some embodiments, the disk manager 530 obtains information determining the set of blocks that the database query is interested in and prefetches blocks based on this information. For example, the disk manager 530 may prefetch only the blocks that the query has specifically indicated interest in reading. In an embodiment, the disk manager 530 determines which blocks might contain values that are of interest to a particular query, for example, based on a minimum and maximum values associated with a range of column values of interest to the query.

Strategies for Pushing-Out Blocks of Data

The cache manager 540 optimizes requests for new blocks, by pushing out blocks to reduce the number of blocks in memory and make room for new blocks (memory is also referred to herein as cache). If memory is proactively cleared, new block requests do not have to wait for the block to be selected for being pushed out during block faults. Accordingly, the cache manager 540 estimates that a block is not likely to be used even though the block is present in memory.

A scan process reads the database blocks for a query in a scan order, for example, in the increasing order of the sequence number of each row. As a result, once the scan process has read data from a database block, the scan process is unlikely to read the data again. Using a least recently used (LRU) basis for pushing out blocks from the cache does not provide good performance of the cache. If an LRU strategy is implemented for pushing out database blocks from the cache, the database block that was just read by a scan process stays in the cache for a long time before being pushed out of the cache. As a result, database blocks that have very small or no likelihood of being read again in the near future are retained in the cache for a very long time. Accordingly, the LRU strategy for pushing out database blocks from a cache does not perform well for a scan process.

Embodiments mark a database block for being pushed out of cache after the database block has been processed by all scan orders expected to process the database block. In an embodiment, the database block is marked for being pushed out of the cache if either scan processes associated with the database blocks have either completed processing the database block or processed another database block that occurs after the database block in the scan order of the scan process. The cache manager 540 keeps track of the progress of each scan operation of a query process. This allows the cache manager 540 to identify a block to push out based on the progress of scan of the associated query processes rather than on a simple LRU basis.

Figure 9:
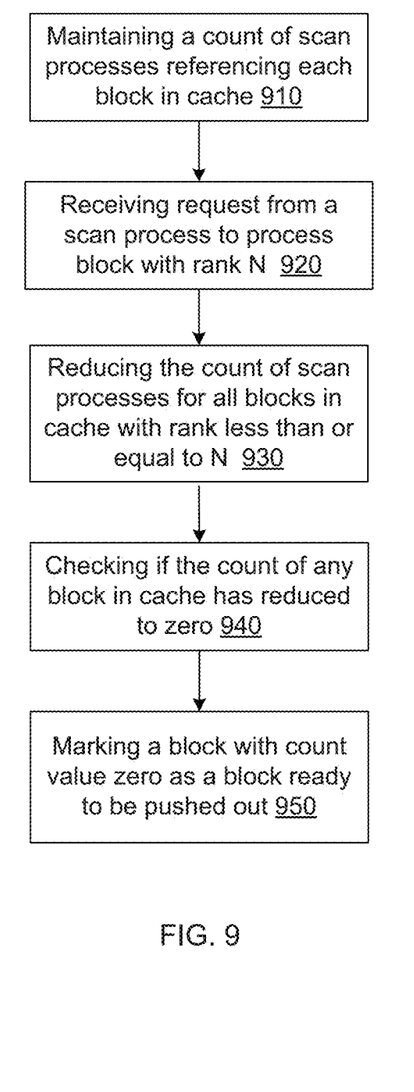
FIG. 9 describes a flowchart for identifying blocks that are pushed out of memory, in accordance with an embodiment.

FIG. 12 describes a flowchart for identifying blocks that are pushed out of memory, in accordance with an embodiment. The cache manager 540 maintains 910 a count of scan processes referring each database block in the cache. The cache manager 540 receives 920 a request to process data of a database block having rank N according to the scan order of the scan process.

The cache manager 540 reduces 930 the reference count of all database blocks associated with the scan process that have rank less than or equal to N. This includes the current database block that has been processed by the cache manager 540 and any other database blocks in the cache that were expected to be read by the scan process but were never read by the scan process. However, since the scan process has read past these database blocks, their reference count is decreased, assuming that the scan process reads database blocks only in one order, i.e., the scan order. The cache manager 540 also removes the association between the scan process and the database blocks for which the reference count is decreased to avoid the reference count from being further reduced due to future block reads from the scan process.

The cache manager 540 checks 940 whether the reference count of any database blocks have been reduced to zero. The reference count of a database block being reduced to zero indicates to the cache manager 540 that no currently executing scan process is expected to read data from the database blocks. The cache manager 540 marks 950 the database blocks with reference count zero as being ready for being pushed out of the cache. In an embodiment, the cache manager 540 marks these database blocks as free. Accordingly, if a new database block is read into the cache, the cache manager may reuse the storage space used by the database blocks marked free for storing the new database blocks read.

When a query processor 550 is actively reading or writing a block, it pins the block in the cache. This pin corresponds to a count value that may be accessed by the cache manager 540 or by query processors. Query processors increment the count before they read or write the block, and decrement the count when it is safe to evict the block from memory. Accordingly, as soon as a query processor 550 completes reading a database block, the query processor 550 unpins the database block. In one embodiment, a block is pushed out as soon as the block is unpinned by a query processor 550. In another embodiment, the cache manager 540 periodically searches for blocks that are in memory, but have a pin count of zero. In this embodiment, the cache manager 540 selects these blocks and marks them for being pushed out. Once a database block in the cache is marked for being pushed out, the space occupied by the database block in the cache can be used by a new incoming block.

In an embodiment, the cache manager 540 creates a set of cache frame for each scan process. Each cache frame refers to a database block. In an embodiment, the disk manager 530 keeps a count of the number of entities that are expected to read or write a block by counting the number of cache frames that refer to a block. When the last cache frame on a block header is deleted, the cache manager 540 pushes the block out. The ability to have an independent collection of cache frames for each scanner, allows the system to control precisely how many block headers are kept in memory for each scanner.

In addition, the system can create additional collections of cache-frames to provide special-case pushout policies. For example, the system may keep a cache-frame reference for each modified block, to allow the system to push out modified blocks on an LRU basis. And the system keeps a collection of references on all of the blocks that have been read that have low block numbers, to try to keep those blocks in memory if possible to reduce query startup latency. This latter collection is referred to as the "first blocks". In various embodiments, these blocks are pushed out using different strategies.

As the system prefetches a block for a particular scanner, that scanner's cache frame references are removed for all earlier block numbers. Therefore, if a query processor 550 is processing data from a current data block, it is presumed that that query processor 550 no longer needs to read blocks with earlier block numbers, so the cache manager 540 may remove those predecessor cache frame references. As a result, the query processor 550 does not have to explicitly push out the block. Instead, the cache manager 540 uses the progress of the scan process to determine that all blocks before the block being currently processed are unpinned and can be pushed out unless another scan process needs the block. This is so because a scan process always reads the blocks in sequential order of their block numbers. Once the scan process has read a block it is unlikely that the scan process would read this block again in near future. This behavior is different from LRU strategy since accordingly to LRU strategy, a recently used block is kept in the memory until it becomes a least recently used block and may stay in memory for a long time.

In an embodiment, early blocks, for example, the first few blocks of a column that are read are preferred to be kept in memory and not pushed out right after the scan processes have completed reading them. This policy is implemented by incrementing the count of scan processes referring the blocks, for example, by even if there are no scan processes reading them. When the system runs out of cache space, the system attempts to push out these early blocks first, before resorting to pushing out blocks that have been prefetched into scanner cache-frame collections. This is because these blocks were kept in memory just as a matter of policy and not because a scan process was reading from them. If a scan process is reading from these blocks, their reference count value would be higher and the cache manager 540 may determine that the particular early blocks with higher reference count values are not pushed out. In an embodiment, new blocks that correspond to blocks created for writing to them are assigned an extra reference count to make sure that they stay in memory.

In an embodiment, each time a block is added to a scanner's collection of references, the system creates an extra reference in the "new blocks" collection thereby enforcing the LRU strategy for pushing out these blocks. This ensures that the new block remain in memory even after the scan completes, but can be pushed out via the LRU mechanism.

A block can have cache-frames referencing it without being in memory. The existence of cache-frame references indicates a scanner's potential interest in a block, while pinning indicates that the block is currently in use. Strategies disclosed for pushing out blocks from cache are applicable to database that store data in a columnar fashion as well as databases that store data in a row wise fashion.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for selecting blocks for pushing out of a cache in a database system, the method comprising:
   receiving, by a database system, a request to execute a set of scan processes, each scan process corresponding to a database query and configured to read blocks of a table in a scan order;
   prefetching blocks of the table from a persistent storage device for storing in a cache of the database system and associating each prefetched block with scan processes expected to read data from the prefetched block;
   receiving an indication of processing of a first prefetched block by a scan process, the first prefetched block having a rank value based on the order of processing of data by the scan process;
   maintaining a count of the number of scan processes that are expected to read each prefetched block stored in cache, the maintaining comprising, responsive to receiving the indication of processing of the first prefetched block by the scan process: for each prefetched block with a rank in the scan order less than the rank value of the first prefetched block, decreasing the count for the prefetched block;

responsive to decreasing the count of a second prefetched block, determining whether the count for the second prefetched block indicates that no scan processes are expected to read the second prefetched block; and marking the storage of the second prefetched block in the cache for pushing out of the cache if the count of the second prefetched block is determined to indicate that no scan processes are expected to read the second prefetched block.

2. The computer-implemented method of claim 1, further comprising:

retrieving a new block from the persistent storage device for storing in the cache; and responsive to the storage of the prefetched block in the cache being marked as free, reusing the storage of the prefetched block for storing the new block.

3. The computer-implemented method of claim 1, further comprising:

storing a set of blocks of the table in a contiguous portion of the persistent storage device; and wherein prefetching blocks of the table comprises:

receiving a request to read a block from the persistent storage; and retrieving a plurality of blocks stored contiguously with the requested block.

4. The computer-implemented method of claim 1, further comprising:

selecting a prefetched block for keeping in the cache in spite of determining that the scan processes associated with the prefetched block have completed processing the prefetched block.

5. The computer-implemented method of claim 4, wherein the selected prefetched block is a block being modified.

6. The computer-implemented method of claim 4, wherein the selected prefetched block is a block with a rank within the table below a threshold value.

7. The computer-implemented method of claim 4, wherein the selected prefetched block is pushed out of the cache using a least recently used strategy.

8. A computer-implemented method for selecting blocks for pushing out of a cache in a database system, the method comprising:

receiving, by a database system, a request to execute a set of scan processes, each scan process corresponding to a database query and configured to read blocks of a table in a scan order;

prefetching blocks of the table from a persistent storage device for storing in a cache of the database system and associating each prefetched block with at least a scan process expected to read data from the prefetched block;

receiving a request to process data of a prefetched block by a scan process;

maintaining a count of the number of scan processes that are expected to read each prefetched block stored in cache;

responsive to the scan process processing the prefetched block, decreasing the count for another prefetched block with a rank in the scan order less than or same as the rank of the prefetched block; and responsive to the count of the other prefetched block becoming zero, marking the other prefetched block for pushing out of the cache.

9. The computer-implemented method of claim 8, further comprising:

retrieving a new block from the persistent storage device for storing in the cache; and responsive to the storage of the prefetched block in the cache being marked as free, reusing the storage of the prefetched block for storing the new block.

10. The computer-implemented method of claim 8, further comprising:

storing a set of blocks of the table in a contiguous portion of the persistent storage device; and wherein prefetching blocks of the table comprises:

receiving a request to read a block from the persistent storage; and retrieving a plurality of blocks stored contiguously with the requested block.

11. A computer-readable storage medium storing computer-executable code for pushing out blocks from a cache of a database system, the code, when executed by a processor, causing the processor to:

receive a request to execute a set of scan processes, each scan process corresponding to a database query and configured to read blocks of a table in a scan order;

prefetch blocks of the table from a persistent storage device for storing in a cache of the database system and associating each prefetched block with scan processes expected to read data from the prefetched block;

receive an indication of processing of a first prefetched block by a scan process, the first prefetched block having a rank value based on the order of processing of data by the scan process;

maintain a count of the number of scan processes that are expected to read each prefetched block stored in cache, the maintaining comprising, responsive to receiving the indication of processing of the first prefetched block by the scan process: for each prefetched block with a rank in the scan order less than the rank value of the first prefetched block, decrease the count for the prefetched block;

responsive to decreasing the count of a second prefetched block, determine whether the count for the second prefetched block indicates that no scan processes are expected to read the second prefetched block; and mark the storage of the second prefetched block in the cache for pushing out of the cache if the count of the second prefetched block is determined to indicate that no scan processes are expected to read the second prefetched block.

12. The computer-readable storage medium of claim 11, wherein the code further causes the processor to:

retrieve a new block from the persistent storage device for storing in the cache; and responsive to the storage of the prefetched block in the cache being marked as free, reuse the storage of the prefetched block for storing the new block.

13. The computer-readable storage medium of claim 11, wherein the code further causes the processor to:

store a set of blocks of the table in a contiguous portion of the persistent storage device; and wherein prefetching blocks of the table causes the processor to:

receive a request to read a block from the persistent storage; and retrieve a plurality of blocks stored contiguously with the requested block.

14. A computer-implemented system for storing data in a database, the system comprising:

a computer processor; and a computer-readable storage medium storing computer program modules configured to execute on the computer processor, the computer program modules comprising a cache manager module configured to:
  receive a request to execute a set of scan processes, each scan process corresponding to a database query and configured to read blocks of a table in a scan order;
  prefetch blocks of the table from a persistent storage device for storing in a cache of the database system and associating each prefetched block with scan processes expected to read data from the prefetched block;
  receive an indication of processing of a first prefetched block by a scan process, the first prefetched block having a rank value based on the order of processing of data by the scan process;
  maintain a count of the number of scan processes that are expected to read each prefetched block stored in cache, the maintaining comprising, responsive to receiving the indication of processing of the first prefetched block by the scan process: for each prefetched block with a rank in the scan order less than the rank value of the first prefetched block, decrease the count for the prefetched block;
  responsive to decreasing the count of a second prefetched block, determine whether the count for the second prefetched block indicates that no scan processes are expected to read the second prefetched block; and
  mark the storage of the second prefetched block in the cache for pushing out of the cache if the count of the second prefetched block is determined to indicate that no scan processes are expected to read the second prefetched block.

15. The computer-implemented system of claim 14, wherein the cache manager module is further configured to:
  retrieve a new block from the persistent storage device for storing in the cache; and
  responsive to the storage of the prefetched block in the cache being marked as free, reuse the storage of the prefetched block for storing the new block.

16. The computer-implemented system of claim 14, wherein the cache manager module is further configured to:
  store a set of blocks of the table in a contiguous portion of the persistent storage device; and
  prefetch blocks of the table by:
    receiving a request to read a block from the persistent storage; and
    retrieving a plurality of blocks stored contiguously with the requested block.

* * * * *